United States Patent [19]

Bauer

[11] Patent Number: 5,548,997
[45] Date of Patent: Aug. 27, 1996

[54] APPARATUS FOR APPLYING A KNOWN AXIAL FORCE TO A VALVE STEM

[75] Inventor: Donald L. Bauer, Atascadero, Calif.

[73] Assignee: Westinghouse Electric Corporation, Pittsburgh, Pa.

[21] Appl. No.: 232,570

[22] Filed: Apr. 25, 1994

Related U.S. Application Data

[60] Continuation-in-part of Ser. No. 25,498, Mar. 3, 1993, Pat. No. 5,305,637, which is a division of Ser. No. 753,785, Sep. 3, 1991, Pat. No. 5,199,301.

[51] Int. Cl.$^6$ ................................................ G01M 19/00
[52] U.S. Cl. ............................................. 73/168; 73/806
[58] Field of Search ............................ 73/168, 761, 805, 73/825, 806; 251/129.12, 129.03

[56] References Cited

U.S. PATENT DOCUMENTS

| | | |
|---|---|---|
| 3,942,368 | 3/1976 | Hoyt . |
| 3,954,005 | 5/1976 | Edwards . |
| 3,965,736 | 6/1976 | Welton et al. . |
| 4,255,967 | 3/1981 | Crymonprez et al. . |
| 4,428,223 | 1/1984 | Trevisan ................................ 73/168 |
| 4,570,903 | 2/1986 | Crass ..................................... 73/168 |
| 4,594,900 | 1/1986 | Pellerin et al. . |
| 4,607,534 | 8/1986 | Cerbone . |
| 4,802,367 | 2/1989 | Petersen et al. ......................... 73/805 |
| 4,805,451 | 2/1989 | Leon . |
| 4,831,873 | 5/1989 | Charbonneau et al. ................. 73/168 |
| 4,891,975 | 1/1990 | Charbonneau et al. . |
| 4,911,004 | 3/1990 | Leon . |
| 5,174,152 | 12/1992 | Wohld ..................................... 73/168 |
| 5,275,036 | 1/1994 | Schulz et al. ........................... 73/168 |
| 5,454,273 | 10/1995 | Smith ...................................... 73/168 |

FOREIGN PATENT DOCUMENTS 2086063  5/1982  United Kingdom .

Primary Examiner—William A. Cuchllinski, Jr.
Assistant Examiner—Andrew Hirshfeld
Attorney, Agent, or Firm—David G. Maire

[57] ABSTRACT

Method and apparatus for simulating operating conditions on a motor operated valve. The present invention provides a means for simulating actual operating load conditions, such as a simulated accident condition, for valves. An axial force is placed on the valve stem by a hydraulically operating loading system to simulate loading conditions associated with a postulated accident, and the valve operator is actuated. The response of the valve during the simulated loading condition is monitored to ensure that the valve is capable of operating, such as to close or open, in the event of an unusual condition.

8 Claims, 5 Drawing Sheets

APPARATUS FOR APPLYING A KNOWN AXIAL FORCE TO A VALVE STEM

This application is a continuation-in-part of application Ser. No. 025,498 filed on Mar. 3, 1993, which is now U.S. Pat. No. 5,305,637, which in turn is a divisional application of Ser. No. 753,785, filed Sep. 3, 1991, now U.S. Pat. No. 5,199,301.

BACKGROUND OF THE INVENTION

The present invention is in the field of mechanical testing and specifically relates to apparatus for applying a known axial force to a valve stem or to a shaft, the ends of which are not accessible.

At numerous points in a nuclear power plant, the flow of a fluid is controlled by large gate valves. When a considerable pressure difference exists between opposite sides of the gate, frictional forces become large and a large force must be exerted by the valve stem to move the gate. Under emergency conditions the pressure difference may reach very large values, and there is concern as to whether the valve will operate or can be operated safely under those conditions. In particular, there is concern about the force on the valve stem or other components.

FIG. 1 shows the type of valve on which the present invention is used. The operator (actuator) is connected to the valve by a yoke, and the valve stem is located between the two legs of the yoke. Obviously, the force in the valve stem is equal to the sum of the force in the two legs, but opposite in direction. It was well-known, even before U.S. Pat. No. 4,805,451, to install a strain sensor on one of the legs of the yoke to measure its elongation, from which the stress in the valve stem can be calculated based on knowledge of the size and material of the legs of the yoke.

With so much at stake, it would be highly desirable to provide for an independent check of the calculated force in the valve stem. This can be done by calibrating the strain sensor(s) mounted on the leg(s) of the yoke, or other sensors mounted at appropriate points on the valve. The calibration consists in applying a known force to the valve stem and noting the corresponding reading(s) of the strain sensor(s).

Once the reading of the strain sensor has been found for known amounts of force applied to the valve stem, there is a basis for believing that a particular reading of the strain sensor implies a particular amount of force on the valve stem.

In 1985 the U.S. Nuclear Regulatory Commission issued Generic Letter 85-03 which required operability verification of certain safety-related motor operated valves. Results, or lack thereof, from that investigation prompted the Commission to issue in 1989 Generic Letter 89-10 which required extensive verification, through in-depth accident condition testing, of a considerable larger number of motor operated valves. However, accident condition testing, i.e., configuring a plant system (piping, pumps, valves, and controls) to simulate accident conditions is costly, potentially hazardous and, in some cases, virtually impossible to perform without jeopardizing plant equipment integrity. In addition, current regulations propose follow-up testing, perhaps at periodic intervals, according to these same difficult accident conditions. Presently, there is no known method of satisfying all GL 89-10 requirements without actually generating system accident differential pressures across the valve and attempting to cycle the motor operated valve to demonstrate capability.

U.S. Pat. No. 4,891,975 to Charbonneau et al. discloses a prior art method for testing of motor operated valves under simulated loading conditions to determine a power parameter associated therewith. The power parameter is then measured during valve in use. The power parameter measured during imposition of the load is correlated with the power parameter measured during valve in use to provide an indication of thrust load developed in the valve operator during valve in use.

The novel features which are believed to be characteristic of the invention, both as to organization and method of operation, together with further objects and advantages thereof, will be better understood from the following description considered in connection with the accompanying drawings in which several preferred embodiments of the invention are illustrated by way of example. It is to be expressly understood, however, that the drawings are for the purpose of illustration and description only and are not intended as a definition of the limits of the invention.

SUMMARY OF THE INVENTION

An apparatus for simulating an operating load condition on a valve stem mounted in a valve yoke comprises first and second loading beams positioned on opposite sides of the valve stem and elongated in a direction generally perpendicular to the valve stem, and means connecting the first and second loading beams and holding them together. First and second legs are pivotally connected to said first and second loading beams and extend approximately parallel to the valve stem. A first force means for exerting a force against the first and second loading means to exert a force on the valve stem. Means are provided for adjusting the force exerted on the valve stem, and for measuring the force exerted on the valve stem.

A method of testing a motor operated valve under simulated accident conditions utilizing the apparatus comprises the steps of positioning the loading means on the valve such that a force can be exerted on the valve stem by the adjustable force means. The loading means ia actuated to load the valve operator by exerting a force on the valve stem. The valve is actuated by energizing the operator. The force imposed on the stem is controlled by varying the load provided by the loading means. This load is measured by the load measuring means. Operation of the valve and valve operator under simulated loading conditions is then determined. The method is preferably controlled by a programmable computer, which can automatically vary the loading profile of the force exerting means to simulated valve operation during simulated accident scenarios.

DESCRIPTION OF THE PREFERRED EMBODIMENT

Figure 1:
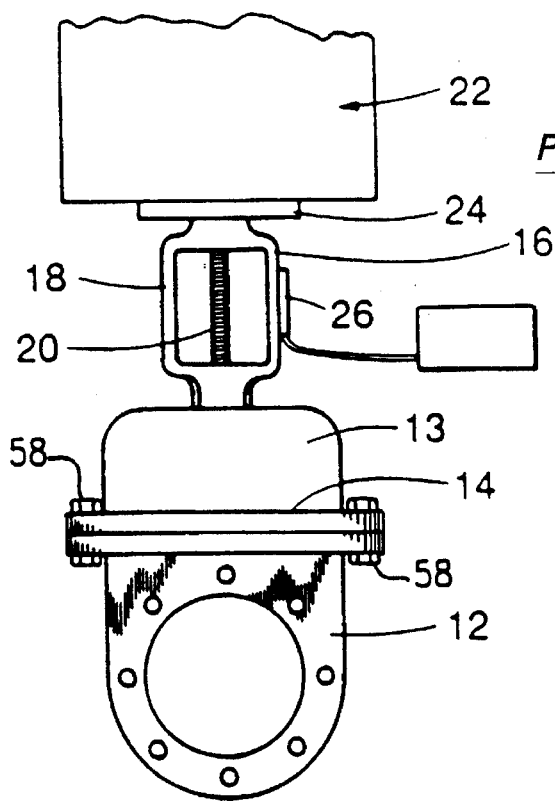
FIG. 1 is a front elevational view of a valve, known in the prior art, of the type on which the present invention is used.

FIG. 1 shows the type of valve with which the present invention was designed to operate. The valve includes a valve body 12 surmounted by a bonnet 13 from which there extends upwardly a yoke structure having legs 16 and 18. The yoke structure serves as a mounting for the valve stem 20 and also provides a point of attachment for the actuator 22 that turns the valve stem, or pushes and pulls it, to close and open the valve. Typically, an actuator plate 24 serves to adapt the actuator to the yoke structure.

It is known that a strain sensor 26 can be attached to one leg 16 of the yoke to provide a signal that is related to the thrust exerted on the valve stem 20.

The device of the present invention applies a force between the valve stem 20 and the body-to-bonnet flange 14 of the valve body.

Figure 2:
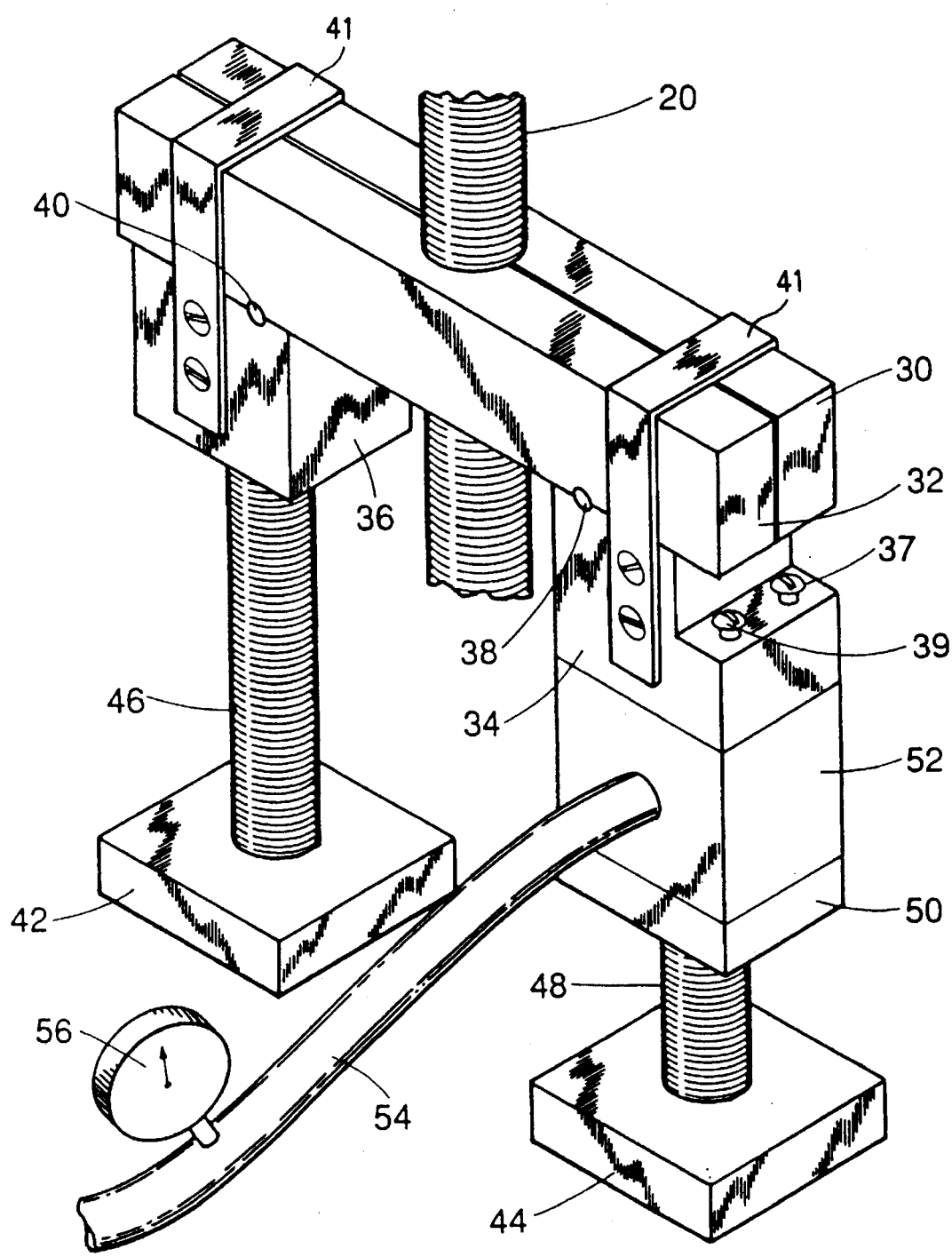
FIG. 2 is a perspective view showing a means for applying a known load to a valve stem.

As shown in FIG. 2, the valve stem 20 is embraced by the two halves 30, 32 of the split loading beam which includes provision for gripping the valve stem, as will be discussed below.

The split loading beam is mounted to the blocks 34 and 36 by means of the pivots 38 and 40 respectively. Blocks 34 and 36 are additionally secured to the split beam halves by U-shaped securing straps 41.

The split loading beam extends through the space between the legs 16, 18 (not shown) of the yoke, and the blocks 42 and 44 rest on top of the body-to-bonnet flange 14 of the valve body 12. The threaded rod 46 provides a means for adjusting the axial position of the split beam along the valve stem 20. Similarly, the block 44, the threaded rod 48, and the block 50 provide a means of adjusting the other leg of the device.

An hydraulic actuator 52 is mounted between the block 50 and the block 34. As is well known in the art, application of pressurized hydraulic fluid to the ram 52 causes the piston of the ram (not visible in FIG. 2) to extend upward a fraction of a centimeter, pushing the block 34 away from the body 52 of the hydraulic ram. The screws 37, 39 serve to couple block 34 to the hydraulic ram 52 and to keep the hydraulic ram positioned directly under the block 34. The force exerted by the hydraulic ram is transmitted through the block 34 and the split loading beam to the valve stem. A pressure gauge 56 measures the hydraulic pressure, from which the magnitude of the force exerted by the hydraulic ram can be calculated.

In an alternative embodiment, air pressure can be used in place of pressurized hydraulic fluid to operate the actuator 52. In another embodiment, the hydraulic actuator 52 can be replaced entirely by a mechanical jack.

In another embodiment, the force exerted by the hydraulic actuator 52 is determined by inserting an instrumented strain button (not shown) in series between the hydraulic actuator 52 and the block 34.

In still another embodiment, the force exerted on the valve stem 20 can be measured by a longitudinally-mounted strain gauge (not shown) on the underside of either of the halves 30, 32 of the split loading beam.

Figure 3:
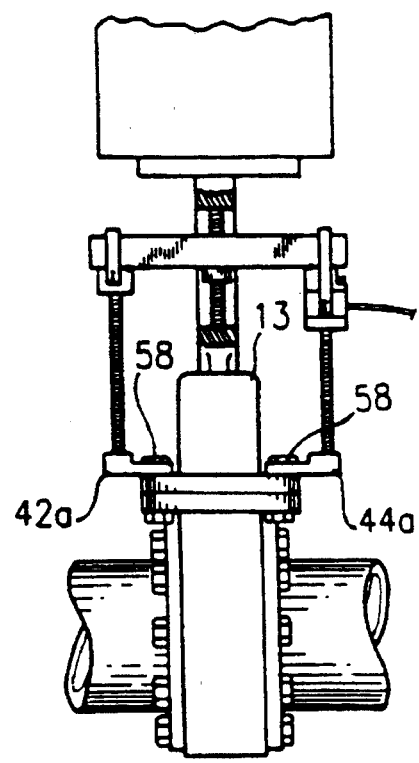
FIG. 3 is a side elevational view showing another embodiment of the device in FIG. 2 in use to apply a compressive load in an upward direction to the valve stem.
Figure 4:
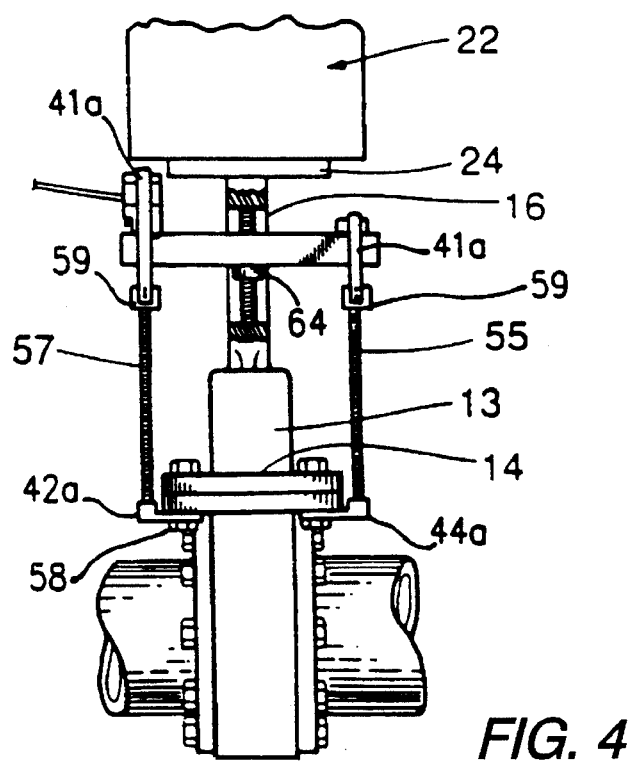
FIG. 4 is a side elevational view showing the device of FIG. 2 in use to apply a tensile load in a downward direction to the valve stem.

FIGS. 3 and 4 show the device of FIG. 2 in use. In FIG. 3, the blocks 42, 44 bear against the top of the body-to-bonnet flange 14 and the hydraulic actuator exerts an upward force on the valve stem. In FIG. 4, the apparatus is inverted for the purpose of applying a downward force on the valve stem. In this latter use, it is convenient to use the connecting supports 55, 57 for the hydraulic actuator to bear against.

Also as shown in FIGS. 3 and 4, blocks 42a and 44a are modified so as to be securable to the valve flange 14. Holes (not shown) are provided in the blocks 42a, 44a so that the valve building bolt nuts 58 can secure the blocks to either the top (FIG. 3) or bottom (FIG. 4) of the flange 14. In this manner, the device is prevented from moving relative to the valve during loading. Also in FIG. 4, securing straps 41a mounting the blocks 34, 36 and ram 52 to the split beam halves 30, 32 are longer to reach to blocks 59 which are secured to legs 55 and 57.

Figure 5:
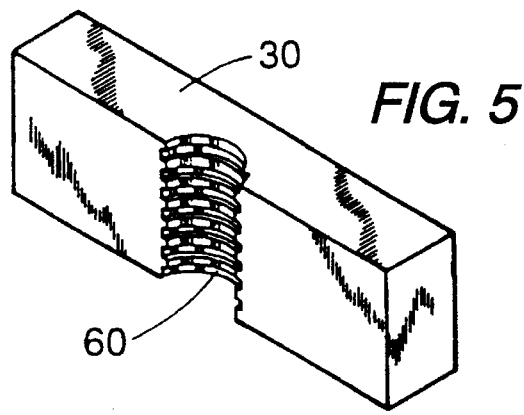
FIG. 5 is a perspective view showing half of the split loading beam used in imposing a load on a threaded valve stem.
Figure 6:
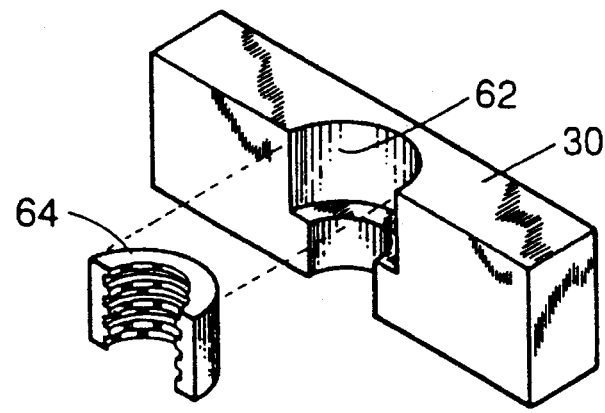
FIG. 6 is a perspective view showing half of the split loading beam used in an alternative embodiment of the loading means for use on a threaded valve stem.

FIGS. 5 and 6 show two different embodiments of one of the halves of the split loading beam for use in obtaining a grip on a threaded valve stem. In the embodiment of FIG. 5, the half 30 includes a threaded section 60. In the embodiment of FIG. 6, the half 30 includes a cavity 62 for holding half of a split nut 64.

Figure 7:
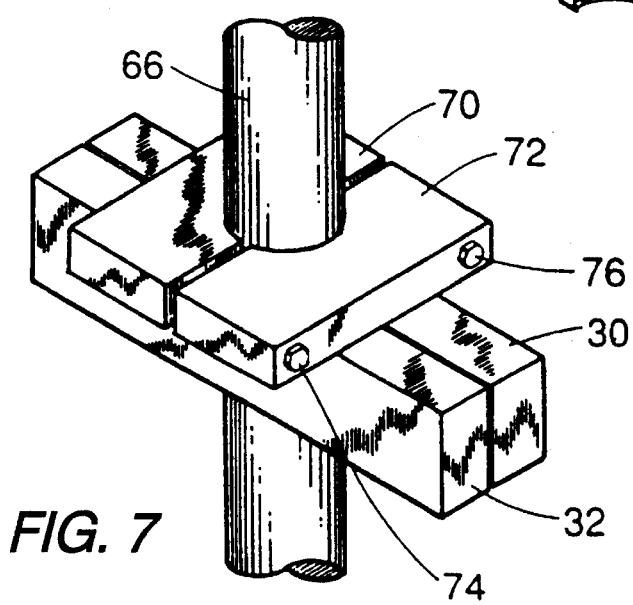
FIG. 7 is a perspective view showing parts of force exerting means for use on an unthreaded valve stem.
Figure 8:
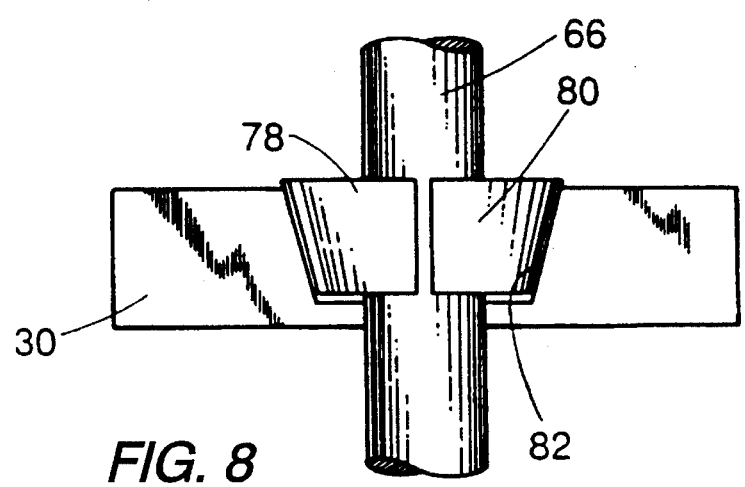
FIG. 8 is a side elevational view showing parts of the force means in an alternative embodiment for use on an unthreaded valve stem.

The embodiments shown in FIGS. 7 and 8 show ways of obtaining a grip on a smooth valve stem 66.

In the embodiment of FIG. 7, the blocks 70 and 72 are drawn together by the bolts 74 and 76 so that the blocks nightly grip the smooth valve stem 66. The split loading beam, which in this embodiment includes a clearance hole for the valve stem, is then brought up axially against the blocks 70, 72.

In the embodiment of FIG. 8, the smooth valve stem 66 is gripped by the wedges 78 and 80 that are contained in a tapered cavity 82 within the halves 30, 32 of the split loading beam.

Figure 9:
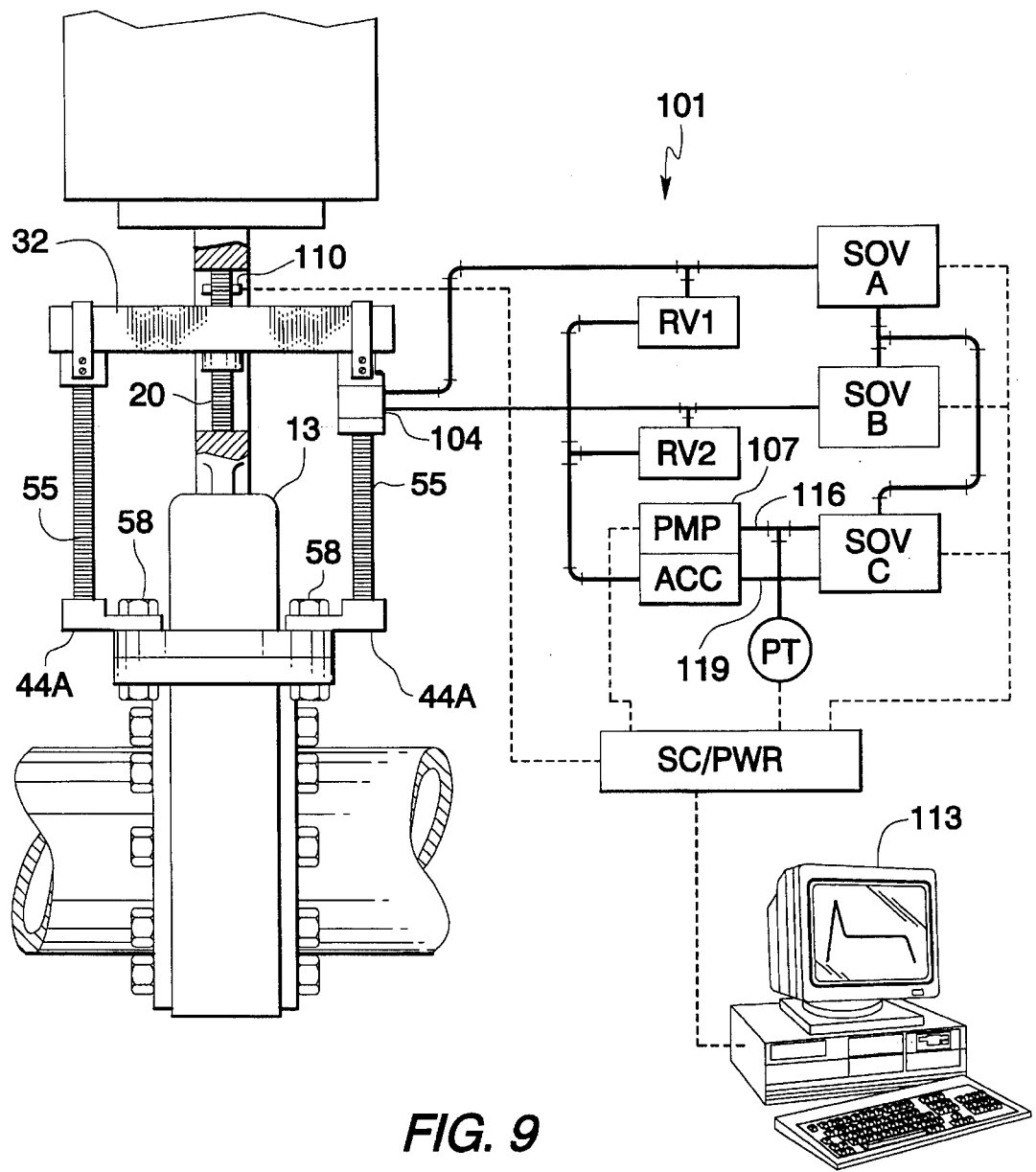
FIG. 9 is a side elevational view showing a preferred embodiment of the present invention for testing a valve during simulated loading conditions.

Referring now to FIG. 9, the use of a force exerting means of the type described in applying a load to valve stem and valve operator under simulated accident conditions will now be described in more detail. The force exerting means 101 preferably comprises a double acting hydraulic cylinder 104 attached to one of the legs 55. The hydraulic cylinder 104 is operably connected to an hydraulic fluid supply 107 comprising a pump PMP and an accumulator ACC via a series of solenoid operated valves SOV A, SOV B, SOV C, and two relief valves RV1 and RV2, the operation of which is described in more detail below. A strain sensor 110, preferably mounted to the stem 20, is provided for measuring the force exerted thereon during operation. A pressure transducer PT also provides feedback information of the force exerted by the hydraulic cylinder 104. The system is under the control of a computer 113, which provides for a pre-programmed loading profile to be administered to the valve during testing. Inputs to and from the computer 113 are via a signal conditioner/power supply SC/PWR. In FIG. 9, hydraulic lines are represented by solid lines and electrical connections are represented by dotted lines, The present invention addresses the major issues of providing a method and apparatus for testing a motor operated valve under simulated accident conditions. With the hydraulic load simulator of the present invention one can simulate loading conditions on a valve, such as that might occur during postulated accident conditions, on the electrically powered motor operator. The two halves 30,32 of the split loading beam of the hydraulically operated apparatus is connected to the valve and valve stem as described above. Preferably, a pre-programmed loading profile is established and installed in the memory of the portable computer. The loading profile positions the solenoid valves SOV A, SOV B AND SOV C in the hydraulic cylinder circuit to restrict fluid bleed rate from the cylinder 104 as the operator is actuated to move the stem in either the open or closed direction. This serves to load the operator to any time-dependent variable load. With this capability, actual load profiles determined at less severe conditions can be increased by the computer to simulate operation under accident conditions.

A typical single stroke operation of the motor operated valve loading simulator could be performed according to the following steps. The valve is placed in the full open position. Solenoid operated valve SOV A is placed in the closed position, while solenoid operated valve SOV B is placed in the open position. Solenoid operated valve SOV C, also referred to as the diverting valve, is positioned to pass hydraulic fluid from the pump PMP through SOV C and SOV B to the hydraulic cylinder 104 along hydraulic line 116. The pump PMP is then started to pressurize the hydraulic cylinder 104 to place an upwardly directed load on the valve stem 20 which in turn loads the operator to normal closing thrust at the start of the cycle. A pressure profile associated with any particular thrust profile is maintained within the computer memory, and the thrust profile is generated during specific differential pressure testing, actual or extrapolated, or developed from generic data. The pressure transmitter PT provides feedback information to the computer 113. The SOV B is then closed and the pump PMP stopped. The SOV C is then positioned so as to bleed hydraulic fluid from the cylinder through SOV B to the accumulator via line 119. The operator is energized and stem loading is controlled by throttling SOV B to restrict hydraulic cylinder 104 bleed rate as the operator pulls the loading beams 30,32 downward, thus pulling the hydraulic cylinder piston (not shown) downward as well. The strain sensor 110 on the stem 20 provides loading level feedback to the computer 113 for continuous loading control. SOV A is to be opened after the start of the cycle to receive hydraulic fluid exchanged as the piston is moved to the opposite end of the cylinder. Relief valves RV1 and RV2 prevent overloading of the device and/or the valve operator and stem.

Figure 10:
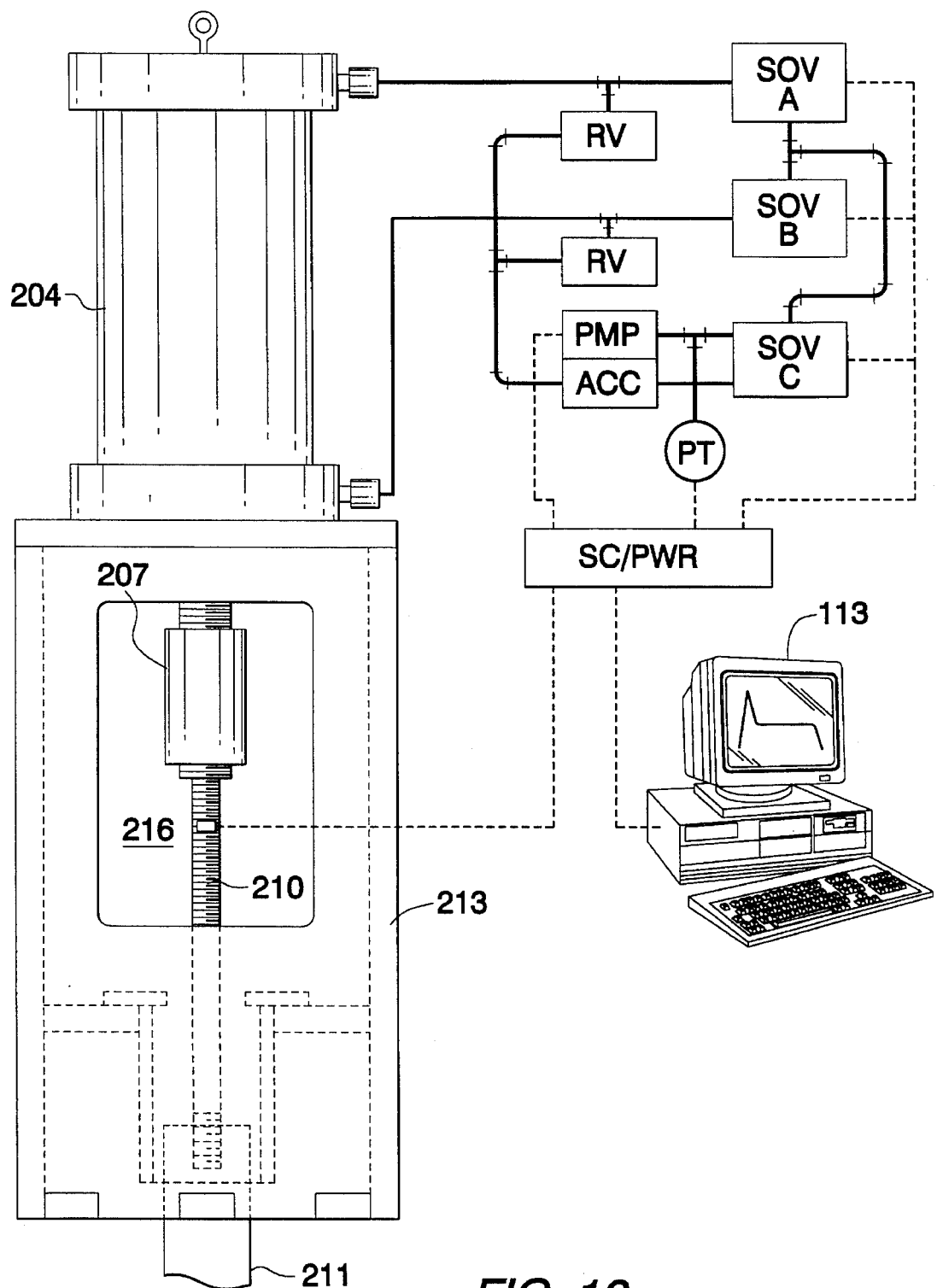
FIG. 10 is a front elevational view of an alternative embodiment of the present invention.

In an alternate embodiment of the invention, as shown in FIG. 10, a hydraulic cylinder 204 is mounted on an adjustable support 213 which in turn is mounted on top of a valve motor operator (not shown). A threaded rod 210 is threaded into the end of the valve stem 211 which is exposed at the top of the motor operator (not shown). The opposite end of the threaded rod 210 is connected to an instrumented coupler 207 which, in turn, is connected to the hydraulic cylinder 204. As in the previous embodiment, a pre-programmed loading profile is administered by a computer to position the solenoid valves in the hydraulic circuit as the operator is moved in either direction. The instrumented coupler 207 provides loading level feedback to the computer for the continuous loading control. The cylindrical, adjustable supports 213 includes an access window 216 for the installation of the instrumented coupler and attaching collar. Overall operation of this embodiment is similar to the operation of the embodiment shown in FIG. 9.

According to the present invention, margins above accident conditions can be imposed to assure accident condition operational capabilities, an assurance not presently achievable with current methods and apparatus. Industry generated or vendor provided loading profiles may be acceptable, thereby eliminating the need to individually generate plant specific or valve specific profiles. Periodic re-verification using the simulator could eliminate the need also to perform difficult and costly operational flow tests, which is another operating condition that can be simulated on a valve operator by the present invention. Operational testing required when certain maintenance is performed or when operator or valve parts are replaced could be satisfied by simulating maximum loading to ensure motor operated valve capability.

In addition to simulating accident loading conditions on a motor operated valve, the present invention can also be used to resolve other operational concerns, such as pre-testing of re-built actuator parts, degraded voltage testing, and troubleshooting.

Re-building of motor operated valve operators, which includes spare parts for future installation or active operators which are being overhauled, is usually performed in a plant's maintenance machine shop. Since loaded operability testing is delayed until the operator is re-installed on the valve in the field, re-build and defective component errors are discovered at a most inopportune time. In this instance the operator must then be removed and returned to the machine shop or disassembled in the field for subsequent repairs. With the loading simulator of the present invention, a several cycle run-in test, as part of the re-build operation, could be quickly and easily conducted while the operator is still in the shop. Any errors or defective parts can be conveniently corrected. Since the operator's future location when it is reinstalled would typically be known, a test which includes the valve operator's expected accident differential pressure loading profile could be imposed on the operator. This can be done for several iterations, to verify operability before the operator is removed from the maintenance area and re-installed on the valve. Pre-setting of valve operator torque and limit switches could also be accomplished prior to re-installation.

Another current concern is over the operability of the valve under de-graded voltage conditions. This could also be easily investigated on each re-built operator. Supplying other than line voltage in the field on an installed motor operator is difficult. However, supplying a reduced voltage in the maintenance machine shop can be easily accomplished. The hydraulic load simulator of the present invention would be used to impose accident loading conditions, or other loading profiles, while the operator was powered in the shop at the minimum accident voltage. Low voltage operability would then be proven and not have to be calculated based upon other operational parameters.

A valve operator may falter or fail under process condition loading but will perform flawlessly when a technician is sent to the field to investigate the valve. This usually occurs under static conditions. This can result when process pressures, temperatures and flows are re-routed as a result of a valve failure and are not present during the troubleshooting test. In this case, the hydraulic simulator can be quickly moved into the field and installed on the suspect valve. The device would then be utilized to supply the variable loading necessary to exercise and locate the load sensitive failed component.

The foregoing detailed description is illustrative of several embodiments of the invention, and it is to be understood that additional embodiments thereof will be obvious to those skilled in the art. The embodiments described herein together with those additional embodiments are considered to be within the scope of the invention. Certainly there are other numerous applications for the hydraulic simulator of the present invention. The above examples are included simply to illustrate the versatility and operational testing techniques that the present invention can perform.

I claim:

1. A method of testing a motor operated valve having a valve operator and a valve stem, the method comprising the steps of:

providing a means for exerting an adjustable force on an object;

positioning said adjustable force means on said valve such that said force can be exerted on said valve stem by said adjustable force means;

operating said adjustable force means to exert said force on said valve stem prior to actuating said valve operator;

without releasing said force, actuating said valve operator to cause said valve stem to move;

varying said force as said valve stem moves in accordance with a predetermined loading profile; and monitoring the operation of said valve.

2. The method of claim 1, wherein electric power is supplied to said valve operator at a degraded voltage during the step of actuating said valve operator.

3. The method of claim 1, wherein said predetermined loading profile simulates accident loading conditions on said valve.

4. The method of claim 1, wherein said predetermined loading profile simulates flow test conditions on said valve.

5. The method of claim 1, further comprising the step of providing a load sensing device for sensing a load in said valve stem, said load sensing device operable to provide a signal corresponding to the load in said valve stem, and using said signal as feedback for controlling said force in accordance with said predetermined loading profile.

6. A method of testing a valve motor operator having a valve stem comprising the steps of:

placing said valve motor operator in a shop maintenance environment;

providing a hydraulic cylinder operable to exert a force on an object;

connecting said hydraulic cylinder to said valve stem;

operating said hydraulic cylinder to exert said force on said valve stem prior to actuating said valve operator;

without releasing said force, actuating said valve operator to cause said valve stem to move;

varying said force as said valve stem moves in accordance with a predetermined loading profile; and monitoring the operation of said valve operator.

7. The method of claim 6, wherein the step of connecting said hydraulic cylinder to said valve stem further comprises the steps of:

connecting an instrumented coupler between said valve stem and said hydraulic cylinder, said coupler operable to provide a signal corresponding to said force;

using said signal as feedback for controlling said force in accordance with said predetermined loading profile.

8. The method of claim 6, wherein electrical power is supplied to said valve operator at a degraded voltage during the step of actuating said valve operator.

* * * * *